H. W. WATTS.
FLY TRAP.
APPLICATION FILED MAY 27, 1918.
1,275,112.
Patented Aug. 6, 1918.
2 SHEETS—SHEET 1.
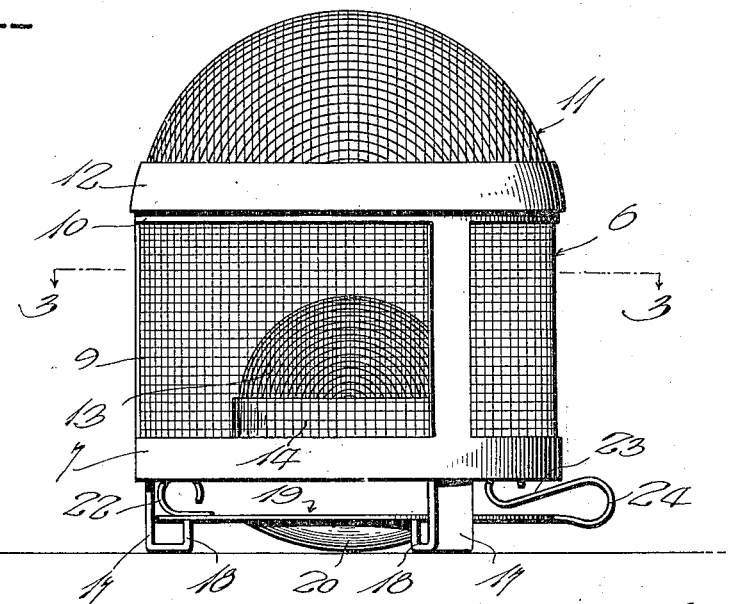
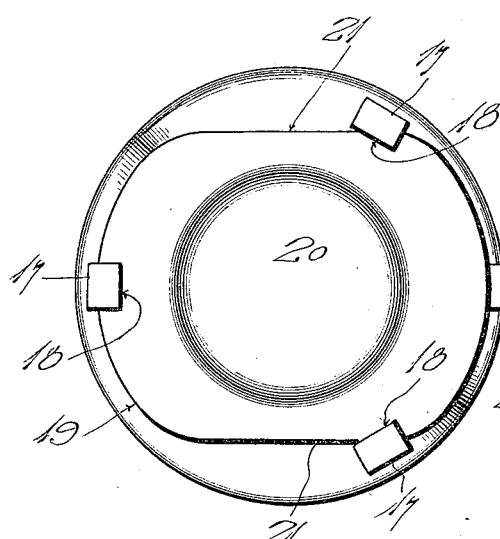
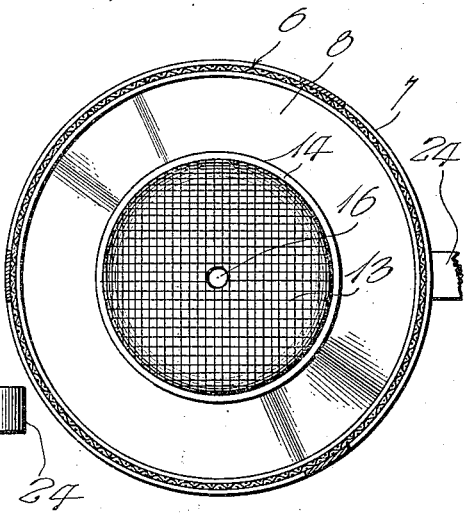
Witness
H. Woodard
Inventor
H. W. Watts
By H. B. Willson & Co.
Attorneys

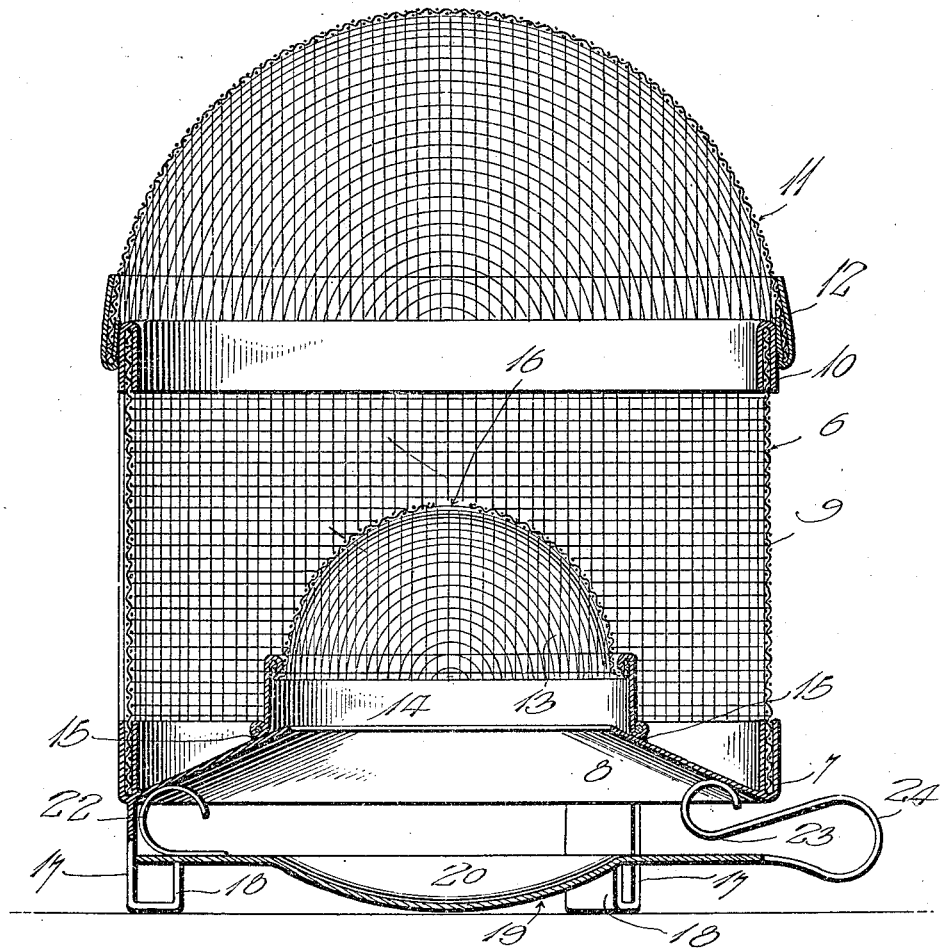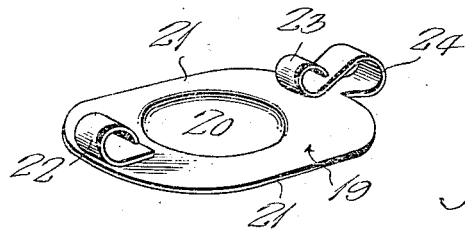

UNITED STATES PATENT OFFICE.

HOWARD W. WATTS, OF BLOOMSBURG, PENNSYLVANIA.

FLY-TRAP.

1,275,112.   Specification of Letters Patent.   Patented Aug. 6, 1918.

Application filed May 27, 1918. Serial No. 236,824.

*To all whom it may concern:*

Be it known that I, HOWARD W. WATTS, a citizen of the United States, residing at Bloomsburg, in the county of Columbia and State of Pennsylvania, have invented certain new and useful Improvements in Fly-Traps; and I do declare the following to be a full, clear, and exact description of the invention, such as will enable others skilled in the art to which it appertains to make and use the same.

This invention relates to fly traps, and it relates more particularly to an improved cage-trap for trapping flies and other winged insects.

One of the objects of this invention is to provide an improved trap which catches the flies alive, and in which the flies may be drowned or otherwise disposed of.

Another object of this invention is to provide a trap of this character with an improved bait-pan, improved supporting means for the bait-pan, and improved yieldable securing means whereby the bait-pan is removably secured to the cage.

Another object is to provide the bait-pan with a manipulative element, which also constitutes a portion of the securing means, and to provide for withdrawing the pan from its supporting elements by movement of the pan in a horizontal direction, also to effect this movement of the pan without danger of spilling the liquid contents which may constitute the bait.

Another object is to provide a trap of this character which is of simple construction, and which may be manufactured at a comparatively low cost.

Other objects and advantages may become apparent to persons who read the following details of description in connection with the accompanying drawings, in which:

Figure 1 is a side elevation of an improved fly trap constructed in accordance with the present embodiment of my invention;

Fig. 2 is a bottom plan view;

Fig. 3 is a horizontal section along the line 3—3 of Fig 1;

Fig. 4 is an enlarged central vertical sectional view; and—

Fig. 5 is a perspective view of my improved bait-pan.

Referring to these drawings in detail, in which similar reference characters correspond with similar parts throughout the several views, the cage, which is generally indicated by the reference character 6, consists of a base or bottom portion 7, formed with an upwardly and inwardly inclined bottom surface 8; the reticular vertical wall 9 having its top portion reinforced by an annular ring 10; and a cover 11 of reticular material, this cover preferably being hemispherical and having its lower edge reinforced by means of an annular ring 12. The annular rings 10 and 12 are preferably formed of sheet metal and are U-shaped in cross section. The base or bottom 7 of the cage also comprises an upward extension which consists of a hemispherical reticular element 13 having its lower edge reinforced by an annular sheet metal element 14, and the lower edge of the latter is soldered or otherwise secured at 15 to the upwardly and inwardy inclined element which has a downwardly facing surface 8. The reticular element or dome 13 is provided with an aperture 16 through its top. This aperture 16 constitutes an inlet or door through which the flies, or other insects, may enter the cage.

The cage is provided with three legs 17 which are formed of sheet metal, and each of these legs is provided with an inwardly and upwardly extending portion 18 which constitutes a support on which the bait-pan 19 (illustrated in Fig. 5) is normally supported. The pan 19 is provided with a central depression or receptacle 20, for holding sweetened water or other bait, the remainder of the pan 19 being substantially plane and normally horizontal, the contour of the pan being oblong, and two of its opposite sides are substantially rectilinear and parallel with one another, as indicated at 21.

By referring to Fig. 2, it will be seen that the width of the pan is somewhat less than the width between two cage-supporting elements of the legs 17, but wider than the distance between the corresponding two pan-supporting elements 18, and therefore, the pan 19 may be removed from and replaced in its normal position by sliding the pan in a horizontal and rectilinear path. In order that the pan may not be accidentally displaced when the trap is moved from place to place, and in order that it may be conveniently manipulated for removal and replacement, I provide spring elements 22 and 23 which normally bear against the surface 8 and thereby yieldingly hold the pan securely. The spring 23 is provided with a loop or bowed portion 24 which constitutes a manipulative element in addition to the function of securing the pan in place.

Although I have described this embodiment of my invention very specifically, it is not intended to limit this invention to these exact details of construction and arrangement of parts, but I am entitled to make changes within the scope of the inventive idea disclosed in the foregoing description and following claims.

What I claim as my invention is:

1. A fly trap comprising a cage having an inlet opening through its lower end and provided with legs which support said lower end above a horizontal surface on which it is seated, each of said legs being formed with a supporting element that extends inwardly with relation to said lower end, and a pan normally seated on the supporting elements of said legs and being removable therefrom by sliding the pan in a horizontal and rectilinear path.

2. A fly trap comprising a cage having an inlet opening through its lower end and provided with legs which support said lower end above a horizontal surface on which it is seated, each of said legs being formed with a supporting element that extends inwardly with relation to said lower end, a pan normally seated on the supporting elements of said legs and being removable therefrom by sliding the pan in a horizontal and rectilinear path, and means for yieldingly securing said pan in its normal position on said supporting element.

3. A fly trap comprising a cage having an inlet opening through its lower end and provided with legs which support said lower end above a horizontal surface on which it is seated, each of said legs being formed with a supporting element that extends inwardly with relation to said lower end, a pan normally seated on the supporting elements of said legs and being removable therefrom by sliding the pan in a horizontal and rectilinear path, said lower end being formed with an upwardly and inwardly inclined surface, and springs on opposite sides of said pan and normally pressing against said inclined surface and thereby yieldingly holding said pan in its normal position on said supporting elements.

4. A fly trap comprising a cage having an inlet opening through its lower end and provided with legs which support said lower end above a horizontal surface on which it is seated, each of said legs being formed with a supporting element that extends inwardly with relation to said lower end, a pan normally seated on the supporting elements of said legs and being removable therefrom by sliding the pan in a horizontal and rectilinear path, and means for yieldingly securing said pan in its normal position on said supporting elements, an element of said means also constituting a handle whereby said pan may be conveniently manipulated.

In testimony whereof I have hereunto set my hand.

HOWARD W. WATTS.

Witnesses:
 ROBERT J. HUNTZINGER,
 BRUCE C. HIDLAY.

Copies of this patent may be obtained for five cents each, by addressing the "Commissioner of Patents, Washington, D. C."